United States Patent Office 3,529,190
Patented Sept. 15, 1970

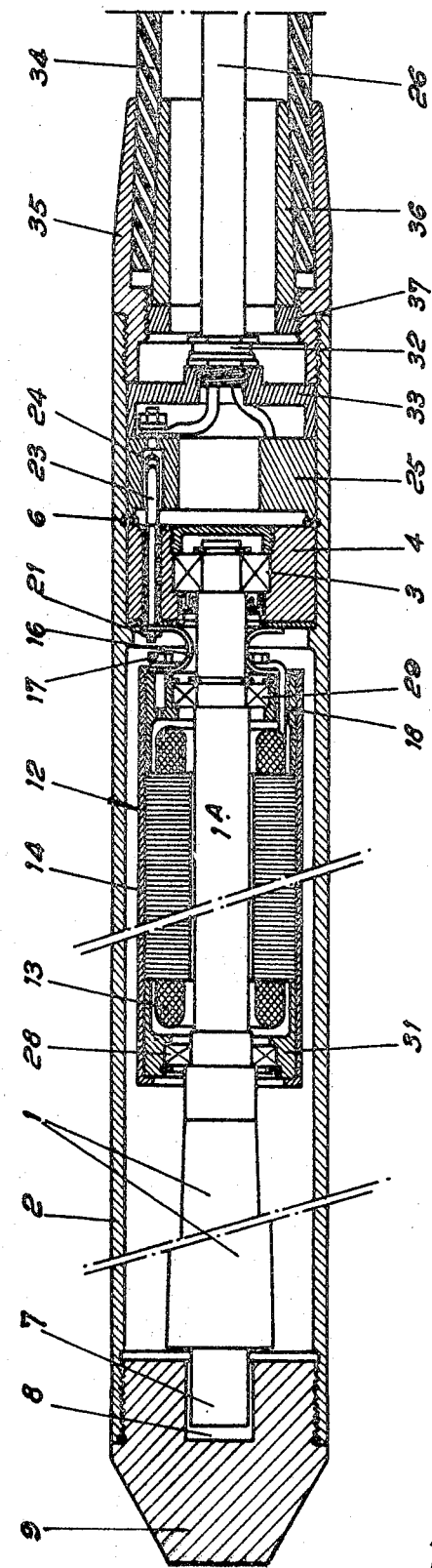

3,529,190
VIBRATOR
Michel A. Fontaine, Boisemont, France, assignor to Vebratechniques S.A., Paris, France, a corporation of France
Filed June 12, 1968, Ser. No. 736,450
Claims priority, application France, June 13, 1967, 110,148
Int. Cl. H02k 7/10
U.S. Cl. 310—81                                     11 Claims

ABSTRACT OF THE DISCLOSURE

A pendulum-type vibrator comprising a tubular casing having a pendulum positioned therein, the free end of the pendulum being adapted to roll around an annular path formed on the inside of the casing. The pendulum is rotated by an electric motor, the rotor of which is fixedly secured to the pendulum. The stator of the electric motor is nonrotatably fixed relative to the casing while being mounted to follow the conical pendulum motion of the rotor.

This invention relates to a pendulum vibrator, that is to say to a vibrator of the type comprising a tubular casing inside which is mounted a mass forming a conical pendulum, the free extremity of which is intended to roll against a central element of the corresponding extremity of said casing.

Vibrators of this type are already known in which the pendulum is driven in rotation by an electric motor whose stator is stationary with respect to the tubular casing and whose rotor is rigidly coupled for rotation with the pendulum and takes part in the conical pendulum motion of this latter with respect to the casing and therefore with respect to the stator. However, this arrangement is subject to disadvantages, one practical consequence being the fact that it gives rise to a continuously changing configuration of the air-gap of the motor. This is unfavorable to the rational operation of the motor and primarily results in overheating unless use is made of a motor which has an unnecessarily high power rating. A further disadvantage of known devices lies in the fact that the motor has to be supplied with current by means of slip-rings.

A chief object of the invention is to provide a vibrator of the type referred-to which is not attended by the above-mentioned disadvantages of known devices.

To this end, in accordance with the invention, the pendulum is constructed as an integral unit with the rotor of the electric motor but the motor is mounted within the casing in such a manner that the stator is permitted to follow the conical pendulum motion of the rotor without being permitted to rotate relative to the casing.

By virtue of this special arrangement, the geometrical axis of the rotor and the geometrical axis of the stator remain continuously in coincident relation, with the result that the configuration of the air-gap does not undergo any cyclic modification. Moreover, the stator which does not rotate within the casing can be supplied with current directly by means of cables, that is to say without any need of slip-rings, especially when a rotating field motor is employed.

In such a case, it is therefore wholly advantageous to construct the armature or rotor in the form of an extension of the pendulum whilst the wound rotating-field stator or field winding is accordingly disposed around the rotor. However, it would remain feasible to contemplate the reverse arrangement in which the pendulum is integral with a tubular armature or rotor placed around a central field winding which would in that case constitute the stator.

Furthermore, the vertex of the cone of oscillation of the conical pendulum can be materialized either by an element of the rotor or by an element of the stator, it being also understood that the rotor can be located either inside or outside the stator. If the vertex of the cone is materialized by an element of the rotor, said element is preferably mounted on the movable ring of a self-aligning bearing whereas, if said vertex is materialized by an element of the stator, said element can be rigidly fixed to one portion of a universal joint whilst the other portion of this latter is rigidly fixed to the tubular casing.

A better understanding of the invention will be gained from the following description and from the single figure of the accompanying drawings in which one embodiment of an improved pendulum vibrator in accordance with the invention is shown in longitudinal cross-section.

The vibrating device which is shown in the drawings comprises a rotating conical pendulum 1 which is mounted inside a tubular casing 2. One extremity of said pendulum is capable of oscillating about a point of the geometrical axis of the casing by means of a self-aligning bearing 3 mounted in a housing 4 which is secured inside the casing 2 by means of a key 6. The free extremity of the pendulum 1 terminates in an axial stud 7 which is capable of rolling in a bore 8 of a nose-cone 9 which is screwed onto the corresponding extremity of the casing.

A portion 1a of the pendulum constitutes the cylindrical rotor of a rotating-field electric motor which is generally designated by the reference numeral 12 and the wound stator 13 of which is mounted within a sleeve 14. Said sleeve is secured relative to the casing and against rotational motion only by means of arcuate blade-springs 16, one extremity of which is attached by means of screws 17 to an insulating liner which is fixed within the sleeve 14, the other extremity of said blade-spring being fixed in the bearing housing 4 by means of screws 21. As will be apparent, the screws 21 are insulated with respect to the housing 4 in order to avoid grounding (earthing) of the motor. Said blade-springs are overlaid with copper strips which serve as connections for supplying current to the field windings of the motor 12 by means of plugs 23, sockets 24 which are mounted in an insulating body 25, and a supply cable 26.

The reference numerals 28 and 29 designate the two sealed ball-bearings of the motor which are mounted within the housings 31 and 18 respectively; the reference numeral 32 designates a packing-gland which is mounted in an insulating washer 33, and the numeral 34 designates a rubber sheath for protecting the supply cable 26, the extremity of said sheath being gripped between the frusto-conical surfaces of an end-piece 35 and a sleeve 36 which is screwed into said end-piece and locked in position by means of a lock-nut 37.

It is clear that the complete electric motor 12 is capable of oscillating about the center of the self-aligning bearing 3 whilst the pendulum stud 7 is intended to perform a rolling movement within the bore 8 of the nose-cone 9 of the casing under the action of the torque to which the said pendulum is subjected when the stator of the motor is supplied with current. Since the complete motor assembly is subjected to the conical pendulum motion, it is obvious that the configuration of its air-gap remains absolutely invariable, thereby permitting operation of the motor under the best conditions. The vibrations are produced by the hypocycloidal rolling motion of the pendulum within the casing.

It is to be understood that the invention is not limited to the embodiment which has been described and illustrated and which has been given solely by way of example and that a large number of modifications may accordingly be made according to the applications which are contemplated without thereby departing from the scope of the invention.

What I claim is:

1. A pendulum vibrator, comprising:
   a tubular casing having an annular wall formed internally thereof;
   a pendulum positioned within said casing, said pendulum having a free end positioned for rolling engagement with said annular wall;
   means mounting said pendulum for permitting said pendulum to undergo a conical pendulum motion relative to said casing;
   electric motor means operatively connected to said pendulum and positioned within said casing for causing rotation of said pendulum whereby said pendulum undergoes said conical pendulum motion;
   said motor means including a rotor fixedly secured to said pendulum for rotation therewith whereby said rotor undergoes said conical pendulum motion; and
   said motor means further including a stator positioned adjacent said rotor and means mounting said stator nonrotatably with respect to said casing while permitting said stator to follow the conical pendulum motion of said rotor.

2. A vibrator according to claim 1, wherein said motor means comprises a rotating field motor whose rotor constitutes a portion of the pendulum, said stator being positioned around said rotor.

3. A vibrator according to claim 1, wherein said motor means is supported within the casing by means of one extremity of said rotor.

4. A vibrator according to claim 3, wherein the extremity of said rotor is carried in the casing by means of a self-aligning bearing.

5. A vibrator according to claim 1, wherein the motor means is supported within the casing by means of one extremity of said stator.

6. A vibrator according to claim 5, wherein the extremity of said stator is supported by means of a universal-type joint.

7. A vibrator according to claim 1 wherein the mounting means for the stator include flexible members connected between the stator and the casing for preventing rotation of the stator relative to the casing while permitting said stator to follow the conical pendulum motion of said rotor.

8. A vibrator according to claim 7, wherein said flexible members comprise U-shaped spring-like members fixedly interconnected between the casing and the end of the stator which is located closely adjacent the oscillation point of the pendulum.

9. A vibrator according to claim 1, wherein the mounting means for said stator includes bearing means rotatably supporting said stator on said pendulum whereby said stator follows the conical pendulum motion of said rotor.

10. A pendulum according to claim 9, wherein the mounting means for said stator also includes flexible members interconnected between said stator and casing for preventing rotation of said stator relative to said casing while permitting said stator to follow the conical pendulum motion of said rotor.

11. A vibrator according to claim 10, wherein said rotor comprises a portion of said pendulum, said stator being positioned adjacent the rotor in surrounding relationship therewith with said bearing means rotatably supporting said stator relative to said rotor whereby a constant air gap is maintained between said stator and said rotor.

References Cited

UNITED STATES PATENTS

| | | | |
|---|---|---|---|
| 2,194,410 | 3/1940 | Svenson | 259—1 |
| 2,480,825 | 9/1949 | Adolph | 310—81 |
| 2,924,730 | 2/1960 | Spitler | 310—67 |
| 3,378,706 | 4/1969 | Franzene | 310—29 |

MILTON O. HIRSHFIELD, Primary Examiner

R. SKUDY, Assistant Examiner

U.S. Cl. X.R.

310—50, 71, 90